(12) United States Patent
Ichikawa

(10) Patent No.: US 10,982,712 B2
(45) Date of Patent: Apr. 20, 2021

(54) SLIDING MEMBER

(71) Applicant: TAIHO KOGYO Co., Ltd., Toyota (JP)

(72) Inventor: Masaya Ichikawa, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 0 days.

(21) Appl. No.: 16/610,576

(22) PCT Filed: Feb. 26, 2019

(86) PCT No.: PCT/JP2019/007219
§ 371 (c)(1),
(2) Date: Nov. 4, 2019

(87) PCT Pub. No.: WO2019/239643
PCT Pub. Date: Dec. 19, 2019

(65) Prior Publication Data
US 2021/0003169 A1    Jan. 7, 2021

(51) Int. Cl.
*F16C 17/02* (2006.01)
*C10M 103/04* (2006.01)
*C22C 12/00* (2006.01)
*C25D 3/56* (2006.01)
*F16C 9/02* (2006.01)
*F16C 33/12* (2006.01)
*C25D 7/10* (2006.01)
*C10N 50/08* (2006.01)

(52) U.S. Cl.
CPC .......... *F16C 17/02* (2013.01); *C10M 103/04* (2013.01); *C22C 12/00* (2013.01); *C25D 3/56* (2013.01); *C25D 7/10* (2013.01); *F16C 9/02* (2013.01); *F16C 33/122* (2013.01); *C10M 2201/053* (2013.01); *C10N 2050/08* (2013.01)

(58) Field of Classification Search
CPC .......... F16C 17/02; F16C 33/122; F16C 9/02; C22C 12/00; C25D 7/10; C25D 3/56; C10M 103/04; C10M 2201/053; C10N 2050/08
See application file for complete search history.

(56) References Cited

U.S. PATENT DOCUMENTS

2004/0241489 A1    12/2004    Kawachi et al.
2008/0102307 A1    5/2008    Zidar

FOREIGN PATENT DOCUMENTS

AT    506641 A1    10/2009
AT    516877 B1    12/2016
(Continued)

OTHER PUBLICATIONS

Communication dated Apr. 27, 2020, issued by the German Patent Office in German Application No. 11 2019 000 053.5.
(Continued)

*Primary Examiner* — Taiwo Oladapo
(74) *Attorney, Agent, or Firm* — Sughrue Mion, PLLC

(57) ABSTRACT

A sliding member including an overlay capable of realizing good fatigue resistance while preventing interlayer peeling. The sliding member includes an overlay formed of an alloy plating film of Bi and Sb. The overlay contains Bi, Sb, and unavoidable impurities. The concentration of Sb on the surface of the overlay is 0.92% by mass or more and 13% by mass or less.

1 Claim, 5 Drawing Sheets

(56) References Cited

FOREIGN PATENT DOCUMENTS

| CN | 102027251 A | 4/2011 | |
|---|---|---|---|
| CN | 102094900 A | 6/2011 | |
| CN | 110582593 A | 12/2019 | |
| JP | 2004-353042 A | 12/2004 | |
| JP | 2006-266445 A | 10/2006 | |
| JP | 2008-057769 A | 3/2008 | |
| WO | WO-2016131074 A1 * | 8/2016 | ............ F16C 43/02 |
| WO | 2019/017182 A1 | 1/2019 | |

OTHER PUBLICATIONS

Communication dated May 6, 2020, from the State Intellectual Property Office of the P.R. of China in Application No. 201980001580.7.
International Search Report for PCT/JP2019/007219 dated May 21, 2019 [PCT/ISA/210].
Written Opinion for PCT/JP2019/007219 dated May 21, 2019 [PCT/ISA/237].

* cited by examiner

US 10,982,712 B2

SLIDING MEMBER

CROSS REFERENCE TO RELATED APPLICATIONS

This application is a National Stage of International Application No. PCT/JP2019/007219 filed Feb. 26, 2019, claiming priority based on Japanese Patent Application No. 2018-112593 filed Jun. 13, 2018.

TECHNICAL FIELD

The present invention relates to a sliding member including an overlay of an alloy plating film of Bi and Sb.

BACKGROUND ART

There is known a sliding member including an overlay that includes a coating layer of Bi and an intermediate layer of Ag (see Patent Literature 1). In Patent Literature 1, the interlayer adhesion of the overlay is improved by adjusting the size of the crystal grains of Ag in the intermediate layer. Furthermore, by adjusting the size of the Bi crystal grains in the coating layer, the adhesion and fatigue resistance of the film of the overlay are improved.

CITATIONS LIST

Patent Literature

Patent Literature 1: JP 2006-266445 A

SUMMARY OF INVENTION

Technical Problems

However, even if the interlayer adhesion is improved by adjusting the size of the crystal grains as in Patent Literature 1, there is a problem that interlayer peeling cannot be avoided since the overlay has a two-layer structure. Furthermore, when the overlay has a two-layer structure, there is a problem that a sudden change in bearing characteristics cannot be avoided during wear.

The present invention has been made in view of the above problems, and an object of the present invention is to provide a sliding member including an overlay capable of realizing good fatigue resistance while preventing interlayer peeling.

Solutions to Problems

In order to achieve the above object, the sliding member of the present invention is a sliding member including an overlay formed of an alloy plating film of Bi and Sb. The overlay contains Bi, Sb, and unavoidable impurities. The concentration of Sb on the surface of the overlay is 0.92% by mass or more and 13% by mass or less.

In the above configuration, since the overlay contains not only soft Bi but also hard Sb, the hard Sb can improve the fatigue resistance. In the overlay, Sb may or may not have a concentration gradient. In any case, it can be confirmed that good fatigue resistance is exhibited if the concentration of Sb on the surface of the overlay is 0.92% by mass or more. It can also be confirmed that no crack is generated on the surface of the overlay even if the concentration of Sb on the surface of the overlay is increased to 13% by mass.

DESCRIPTION OF EMBODIMENTS

Figure 1:
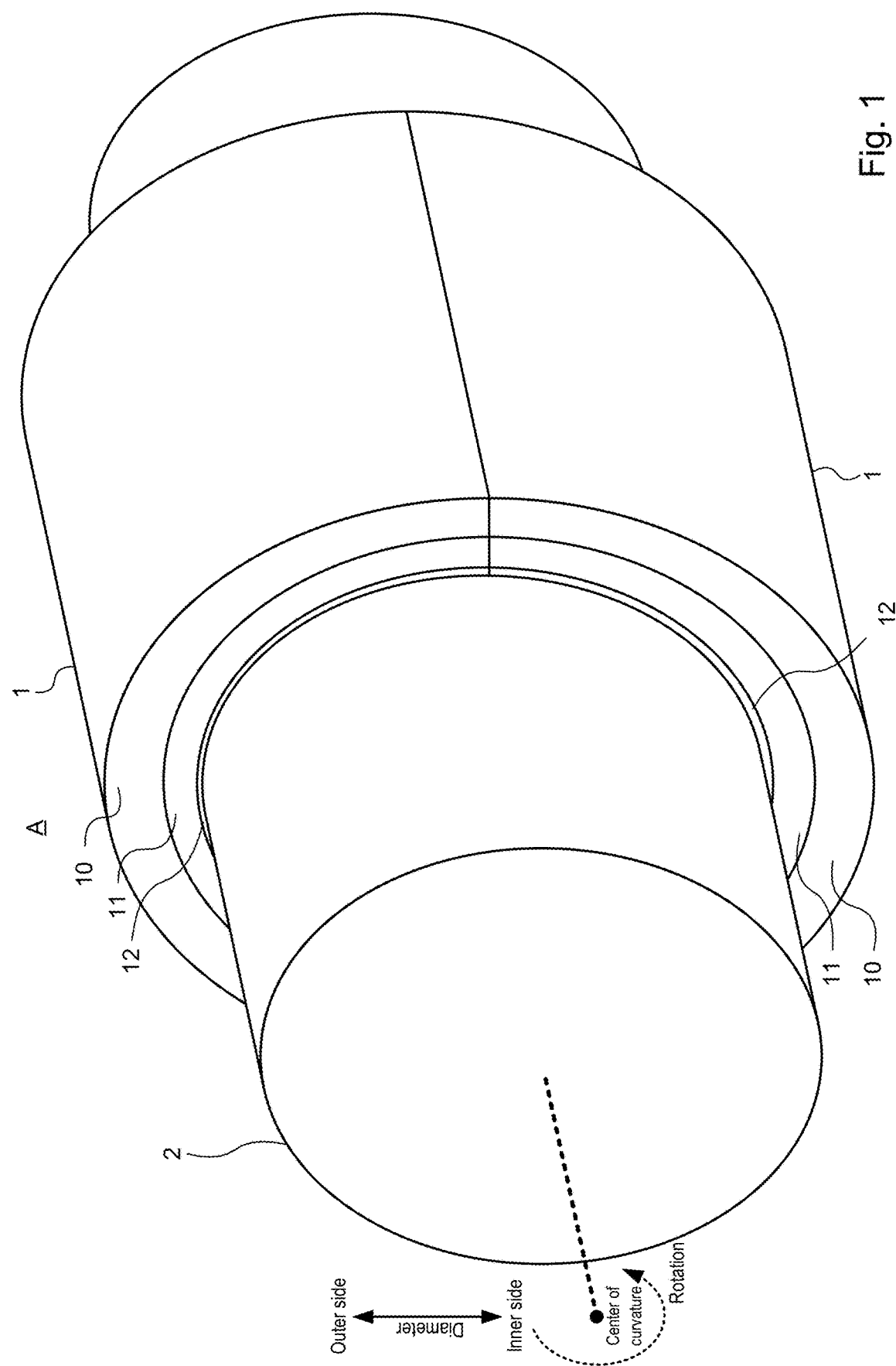
FIG. 1 is a perspective view of a sliding member according to an embodiment of the present invention.

Embodiments of the present invention will be described in the following order.
(1) First Embodiment:
(1-1) Structure of Sliding Member:
(1-2) Method for Manufacturing Sliding Member:
(2) Concentration of Sb:
(3) Other Embodiments:
(1) First Embodiment:
(1-1) Structure of Sliding Member:

FIG. 1 is a perspective view of a sliding member 1 according to one embodiment of the present invention. The sliding member 1 includes a back metal 10, a lining 11, and an overlay 12. The sliding member 1 is a half-shaped metallic member obtained by dividing a hollow cylinder into two equal parts in a diametrical direction, and has a semi-circular arc shape in cross section. By combining the two sliding members 1 so as to form a cylindrical shape, a sliding bearing A is formed. The sliding bearing A bears a cylindrical counter shaft 2 (crankshaft of an engine) in a hollow portion formed therein. The outer diameter of the counter shaft 2 is formed to be slightly smaller than the inner diameter of the sliding bearing A. A lubricating oil (engine oil) is supplied to a gap formed between the outer peripheral surface of the counter shaft 2 and the inner peripheral surface of the sliding bearing A. At that time, the outer peripheral surface of the counter shaft 2 slides on the inner peripheral surface of the sliding bearing A.

The sliding member 1 has a structure in which the back metal 10, the lining 11, and the overlay 12 are laminated in an order of being distant from the center of curvature. Therefore, the back metal 10 constitutes the outermost layer of the sliding member 1, and the overlay 12 constitutes the innermost layer of the sliding member 1. The back metal 10, the lining 11, and the overlay 12 each have a constant thickness in the circumferential direction. The thickness of the back metal 10 is 1.8 mm, the thickness of the lining 11 is 0.2 mm, and the thickness of the overlay 12 is 20 µm. Twice the radius of the surface on the curvature center side of the overlay 12 (the inner diameter of the sliding member 1) is 55 mm. The width of the sliding bearing A is 19 mm. Hereinafter, the term "inner side" means the curvature center side of the sliding member 1, and the term "outer side" means the side opposite to the center of curvature of the sliding member 1. The inner surface of the overlay 12 constitutes the sliding surface for the counter shaft 2.

The back metal 10 is formed of steel containing 0.15% by mass of C, 0.06% by mass of Mn, and the balance Fe. It suffices that the back metal 10 is formed of a material that can support the load from the counter shaft 2 via the lining 11 and the overlay 12, and the back metal 10 may not necessarily be formed of steel.

The lining 11 is a layer laminated on the inner side of the back metal 10 and constitutes the base layer of the present invention. The lining 11 contains 10% by mass of Sn, 8% by mass of Bi, and the balance consisting of Cu and unavoidable impurities. The unavoidable impurities of the lining 11 are Mg, Ti, B, Pb, Cr, and the like, and are impurities mixed in refining or scrapping. The content of the unavoidable impurities in the lining 11 is 0.5% by mass or less in total.

The overlay 12 is a layer laminated on the inner surface of the lining 11. The overlay 12 is an alloy plating film of Bi and Sb. Moreover, the overlay 12 contains Bi, Sb, and unavoidable impurities. The content of the unavoidable impurities in the overlay 12 is 0.5% by mass or less in total.

of the overlay 12 is a first depth (region where the distance from the interface X between the overlay 12 and the lining 11 is 4 μm or less) are larger than the inclination and standard deviation of the concentration of Sb in a second region where the depth from the surface of the overlay is shallower than the first depth (region where the distance from the interface X between the overlay 12 and the lining 11 is larger than 4 μm).

TABLE 1

|  |  | First region | | | | Second region | | | | | | | |
|---|---|---|---|---|---|---|---|---|---|---|---|---|---|
| Distance [μm] from interface | | 1 | 2 | 3 | 4 | 5 | 6 | 7 | 8 | 9 | 10 | 11 | 12 |
| Sb concentration of sample A | Concentration [mass %] | 13.12 | 9.30 | 4.19 | 2.39 | 2.53 | 2.14 | 2.56 | 1.99 | 2.31 | 2.18 | 1.94 | 2.67 |
| | Inclination [mass %/μm] | 3.82 | 5.11 | 1.80 | 0.14 | 0.39 | 0.42 | 0.57 | 0.32 | 0.13 | 0.24 | 0.73 | 0.69 |
| | Average of inclination [mass %/μm] | 2.72 | | | | 0.36 | | | | | | | |
| | Standard deviation [mass %] | 4.89 | | | | 0.27 | | | | | | | |
| Sb concentration of sample B | Concentration [mass %] | 4.37 | 2.78 | 1.57 | 1.66 | 0.90 | 1.42 | 0.96 | 0.83 | 0.94 | 1.07 | 1.11 | 1.11 |
| | Inclination [mass %/μm] | 1.59 | 1.21 | 0.09 | 0.76 | 0.52 | 0.46 | 0.13 | 0.11 | 0.13 | 0.04 | 0.00 | 0.06 |
| | Average of inclination [mass %/μm] | 0.91 | | | | 0.25 | | | | | | | |
| | Standard deviation [mass %] | 1.31 | | | | 0.25 | | | | | | | |
| Sb concentration of sample C | Concentration [mass %] | 1.83 | 0.92 | 1.34 | 1.62 | 0.38 | 1.22 | 1.71 | 1.78 | 2.28 | 2.44 | 2.26 | 2.72 |
| | Inclination [mass %/μm] | 0.91 | 0.42 | 0.28 | 1.24 | 0.84 | 0.49 | 0.07 | 0.50 | 0.16 | 0.18 | 0.46 | 1.30 |
| | Average of inclination [mass %/μm] | 0.71 | | | | 0.61 | | | | | | | |
| | Standard deviation [mass %] | 0.39 | | | | 0.98 | | | | | | | |

|  |  | Second region | | | | | | | | Overall average concentration | First region/second region |
|---|---|---|---|---|---|---|---|---|---|---|---|
| Distance [μm] from interface | | 13 | 14 | 15 | 16 | 17 | 18 | 19 | 20 | | |
| Sb concentration of sample A | Concentration [mass %] | 1.98 | 2.18 | 2.12 | 2.14 | 1.76 | 2.05 | 2.36 | 1.73 | 3.05 | — |
| | Inclination [mass %/μm] | 0.20 | 0.06 | 0.02 | 0.38 | 0.29 | 0.31 | 0.63 | — | — | — |
| | Average of inclination [mass %/μm] | 0.36 | | | | | | | | — | 7.6 |
| | Standard deviation [mass %] | 0.27 | | | | | | | | — | 18.1 |
| Sb concentration of sample B | Concentration [mass %] | 1.05 | 1.26 | 0.53 | 0.63 | 0.95 | 0.55 | 0.76 | 1.08 | 1.31 | — |
| | Inclination [mass %/μm] | 0.21 | 0.73 | 0.10 | 0.32 | 0.40 | 0.21 | 0.32 | — | — | — |
| | Average of inclination [mass %/μm] | 0.25 | | | | | | | | — | 3.7 |
| | Standard deviation [mass %] | 0.25 | | | | | | | | — | 3.2 |
| Sb concentration of sample C | Concentration [mass %] | 1.42 | 1.69 | 2.90 | 1.88 | 2.39 | 3.26 | — | — | 1.89 | — |
| | Inclination [mass %/μm] | 0.27 | 1.21 | 1.02 | 0.51 | 0.87 | — | — | — | — | — |
| | Average of inclination [mass %/μm] | 0.61 | | | | | | | | — | 1.2 |
| | Standard deviation [mass %] | 0.98 | | | | | | | | — | 0.4 |

Figure 2:
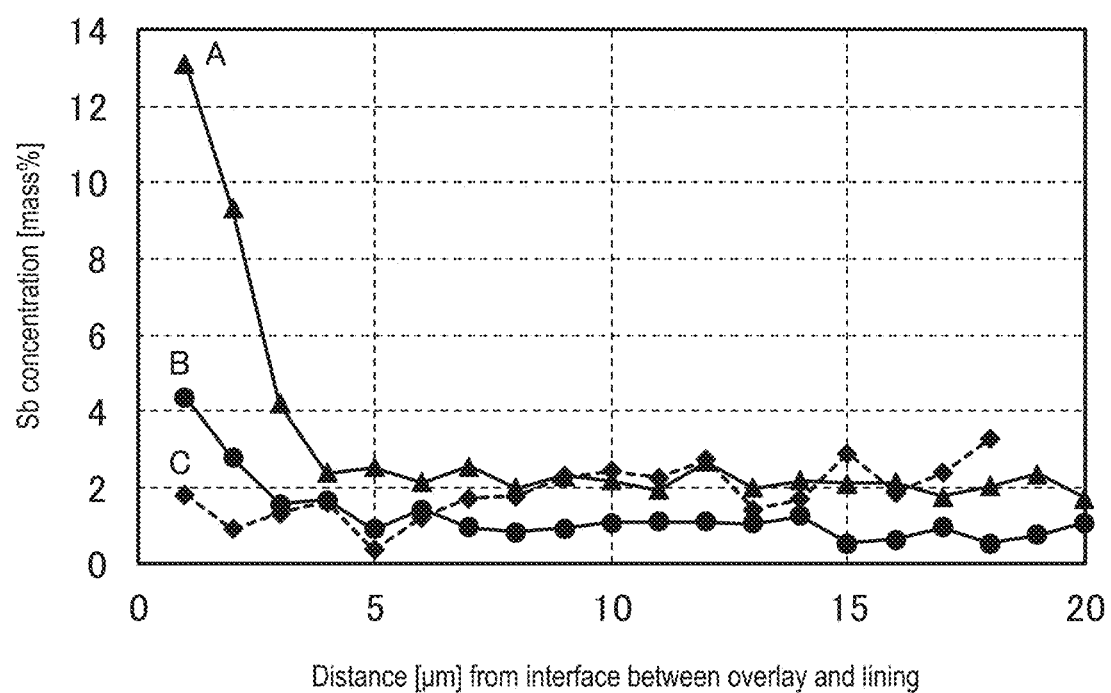
FIG. 2 is a graph of the concentration of Sb in an overlay.

Table 1 indicates the concentration (mass concentration) of Sb in the overlay 12. FIG. 2 is a graph showing the concentration (mass concentration) of Sb in the overlay 12. The horizontal axis in FIG. 2 indicates the distance from the interface between the overlay 12 and the lining 11, and the vertical axis indicates the concentration of Sb. In Table 1 and FIG. 2, the concentration of Sb in sample A (triangles) converging to about 2% by mass, the concentration of Sb in sample B (circles) converging to about 1% by mass, and the concentration of sample C (squares) having no concentration gradient are indicated. As shown in FIG. 2, in samples A and B, the concentration of Sb becomes maximum at the interface between the overlay 12 and the lining 11. In samples A and B, as the distance from the interface between the overlay 12 and the lining 11 increases (as the depth from the surface of the overlay 12 decreases), the concentration of Sb decreases continuously. The average concentration of Sb in the entire overlay 12 was 3.05% by mass.

In samples A and B, the inclination (absolute value) of the concentration of Sb decreases as the distance from the interface between the overlay 12 and lining 11 increases, and the concentration of Sb converges almost constantly in a region where the distance from the interface between the overlay 12 and lining 11 is 4 μm or more. In samples A and B, the inclination and standard deviation of the concentration of Sb in a first region where the depth from the surface The inclination of the concentration of Sb in the first region of sample A is 7.6 times the inclination of the concentration of Sb in the second region. The standard deviation of Sb in the first region of sample A is 18.1 times the standard deviation of the concentration of Sb in the second region. On the other hand, the inclination of the concentration of Sb in the first region of sample B is 3.7 times the inclination of the concentration of Sb in the second region. The standard deviation of Sb in the first region of sample B is 3.2 times the standard deviation of the concentration of Sb in the second region.

The overlay 12 of the present embodiment is formed by the same manufacturing method as that for sample A, and the concentration of Sb on the surface of the overlay 12 having a film thickness of 20 μm was 1.8% by mass. Therefore, it can be determined that the concentration gradient of Sb similar to that in sample A in FIG. 2 exists also in the present embodiment. The concentration of Sb in the overlay 12 can be adjusted by increasing or decreasing the Sb concentration in a plating bath for electroplating of the overlay 12 which will be described later.

Figure 3:
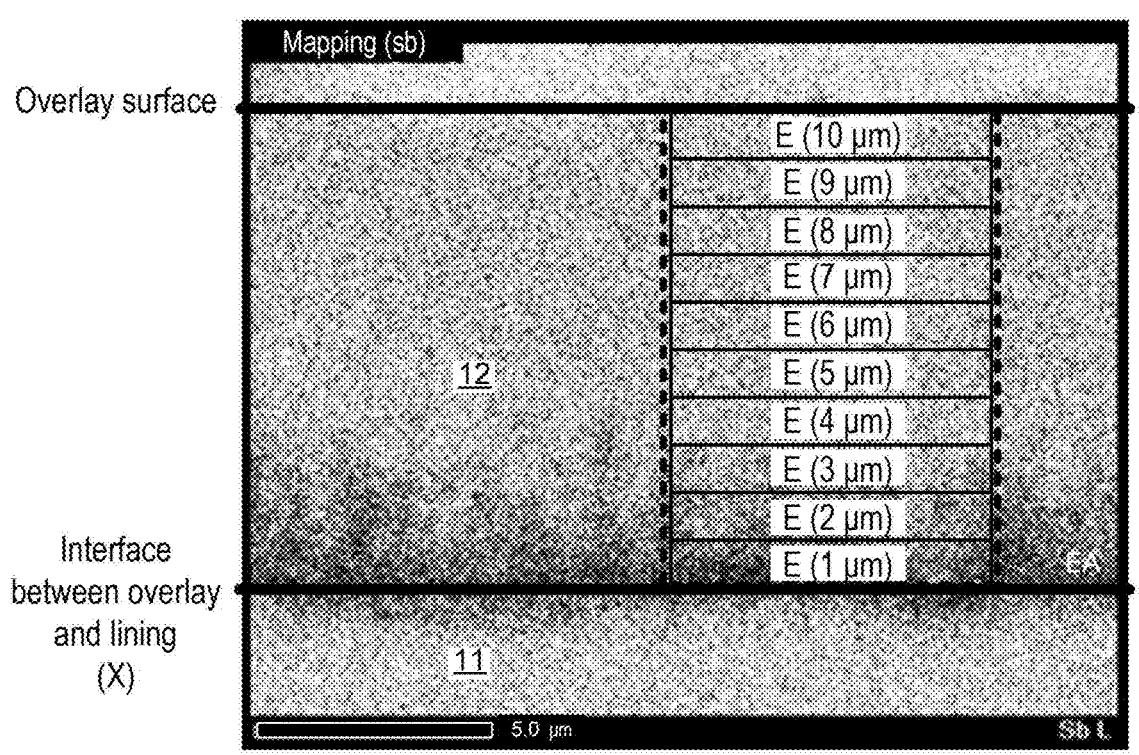
FIG. 3 is a photograph of a cross section of the overlay.

FIG. 3 is a photograph of a cross section of the overlay 12. In the photograph of the cross section in FIG. 3, mapping is performed with a site having a higher concentration of Sb being displayed in a darker color. As shown in FIG. 3, as the depth from the surface of the overlay 12 decreases, the concentration of Sb decreases continuously. That is, as the depth from the surface of the overlay 12 increases, the concentration of Sb increases continuously. In addition, since the balance of Sb can be considered to be Bi, the concentration of Bi decreases continuously as the depth from the surface of the overlay 12 increases. That is, as the depth from the surface of the overlay 12 decreases, the concentration of Bi increases continuously. Note that FIG. 3 is an image of a cross section of the overlay 12 having a thickness of about 10 µm.

The concentration of Sb in the overlay 12 was measured by energy dispersive X-ray spectroscopy using an electron beam microanalyzer (JMS-6610A, manufactured by JEOL Ltd.). Specifically, a plurality of rectangular regions E in which the distance from the interface X between the overlay 12 and the lining 11 to the upper end (end on the surface side) differs by 1 µm are set, and the average mass concentration of Sb in the rectangular regions E was measured as the mass concentration of Sb at each distance. An entire region EA constituted by all the rectangular regions E was set, and the average mass concentration of Sb in the entire region EA was measured as the average concentration of Sb in the entire overlay.

Figure 4:
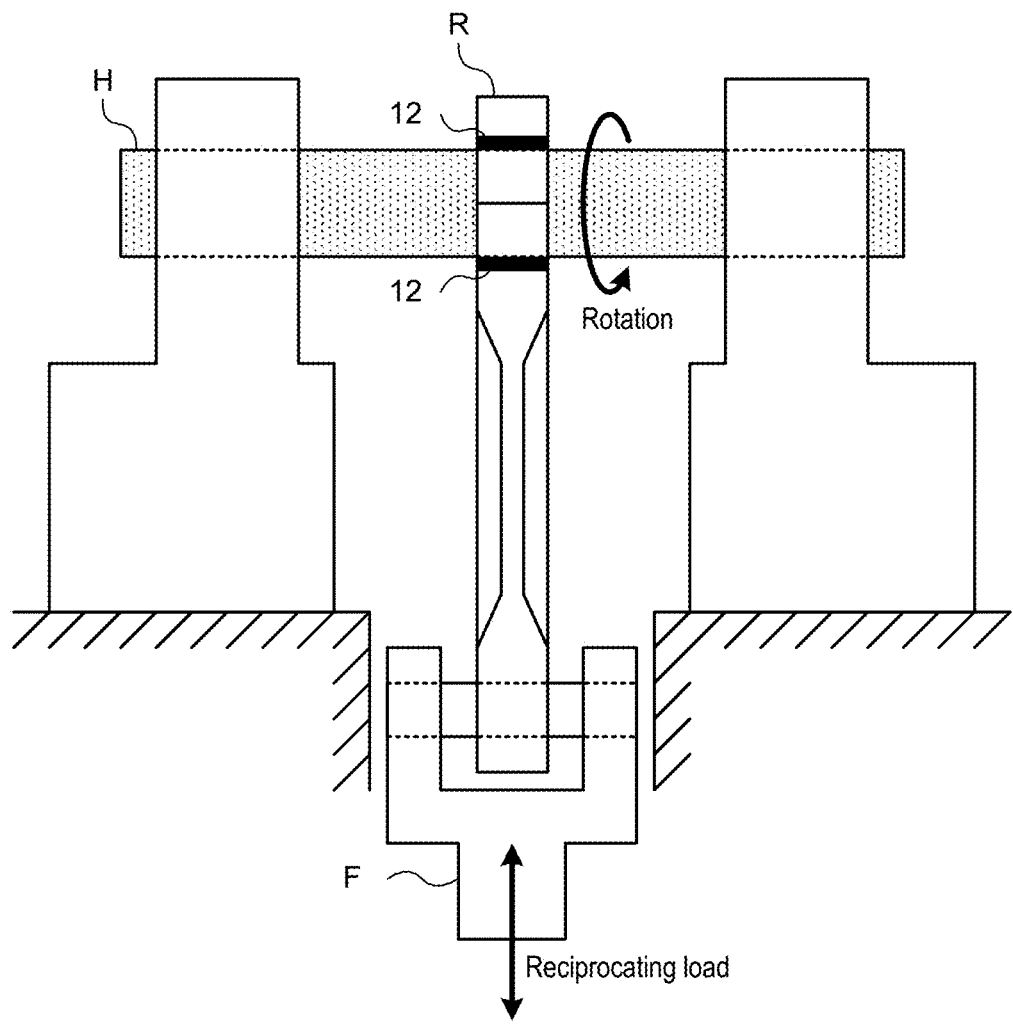
FIG. 4 is an explanatory diagram of a fatigue test.

A fatigue test piece (connecting rod R) having an overlay 12 similar to that of the above-explained sliding member 1 was prepared to measure its fatigue area rate. As a result, the fatigue area rate was 30%, which was good. The fatigue area rate was measured through the following procedures. FIG. 4 is an explanatory diagram of a fatigue test. First, as shown in FIG. 4, a connecting rod R having cylindrical through holes formed at both ends in the longitudinal direction was prepared, and a test shaft H (hatching) was borne in the through hole at one end.

An overlay 12 (black) similar to that of the sliding member 1 was formed on the inner peripheral surface of the through hole for bearing the test shaft H formed in the connecting rod R. The test shaft H was borne on both outer sides of the connecting rod R in the axial direction of the test shaft H, and the test shaft H was rotated so that a sliding speed arrived at 6.6 m/sec. The sliding speed is a relative speed between the surface of the overlay 12 and the test shaft H. The end portion of the connecting rod R on the side opposite to the test shaft H was connected to a moving body F reciprocating in the longitudinal direction of the connecting rod R, and the reciprocating load of the moving body F was set to 80 MPa. Also, engine oil at about 140° C. was fed between the connecting rod R and the test shaft H.

By continuing the above state for 50 hours, the fatigue test of the overlay 12 was carried out. After the fatigue test, the inner surface (sliding surface) of the overlay 12 was photographed from a position on a straight line orthogonal to the surface in such a manner that the straight line served as the main optical axis. The taken image was used as an evaluation image. Then, the damaged portion in the surface of the overlay 12 reflected in the evaluation image was observed with a binocular (magnifying glass) and identified. The percentage of a value obtained by dividing the damaged portion area, which was the area of the damaged portion, by the area of the entire surface of the overlay 12 reflected in the evaluation image was measured as the fatigue area rate.

In the present embodiment described above, since the overlay 12 contains not only soft Bi but also hard Sb, the hard Sb can improve the fatigue resistance. In addition, since the concentration of Sb increases as the depth from the surface increases, good conformability can be realized in the initial stage of wear, and high wear resistance can be realized at a stage where wear progresses. Furthermore, since the concentration of Sb increases as the depth from the surface increases, interlayer peeling can be prevented. Here, Cu has the property of being more easily diffused into Sb than into Bi. However, the average concentration of Sb in the entire overlay 12 is set to less than 3.1% by mass, thereby making it possible to suppress the amount of Cu diffused from the lining 11 into the overlay 12, and to prevent the diffused Cu from reducing the fatigue resistance.

Also, the inclination of the concentration of Sb in a first region where the depth from the surface of the overlay 12 is a first depth (region where the distance from the interface X between the overlay 12 and the lining 11 is 4 µm or less) is larger than the inclination of the concentration of Sb in a second region where the depth from the surface of the overlay is shallower than the first depth (region where the distance from the interface X between the overlay 12 and the lining 11 is larger than 4 µm). This allows the hardness of the overlay 12 to be rapidly increased as the wear progresses.

(1-2) Method for Manufacturing Sliding Member:

First, a flat plate of low carbon steel having the same thickness as the back metal 10 was prepared.

Next, powder of a material constituting the lining 11 was scattered on the flat plate formed of low carbon steel. Specifically, Cu powder, Bi powder, and Sn powder were scattered on the flat plate of low carbon steel so as to attain the mass ratio among the respective components in the lining 11 described above. It suffices that the mass ratio among the respective components in the lining 11 can be satisfied, and alloy powder such as Cu—Bi or Cu—Sn may be scattered on the flat plate of low carbon steel. The particle sizes of the powders were adjusted to 150 µm or less by a test sieve (JIS Z 8801).

Next, the flat plate of low carbon steel and the powders sprayed on the flat plate were sintered. The sintering temperature was controlled to 700 to 1000° C., and the sintering was performed in an inert atmosphere. After the sintering, the sintered flat plate was cooled. The lining 11 need not necessarily be formed by sintering, and may be formed by casting or the like.

After completion of the cooling, a Cu alloy layer is formed on the flat plate of low carbon steel. The Cu alloy layer contains soft Bi particles precipitated during the cooling.

Next, the low carbon steel having a Cu alloy layer formed thereon was pressed so as to have a shape obtained by dividing a hollow cylinder into two equal parts in the diameter direction. At this time, the pressing process was performed so that the outer diameter of the low carbon steel was matched with the outer diameter of the sliding member 1.

Next, the surface of the Cu alloy layer formed on the back metal 10 was cut. At this time, the cutting amount was controlled so that the thickness of the Cu alloy layer formed on the back metal 10 was the same as that of the lining 11. Thereby, the lining 11 can be formed by the Cu alloy layer after the cutting process. The cutting process was carried out by a lathe on which a cutting tool material made, for example, of sintered diamond is set. The surface of the lining 11 after the cutting process constitutes the interface between the lining 11 and the overlay 12.

Next, Bi was laminated by a thickness of 10 µm on the surface of the lining 11 by electroplating, whereby the overlay 12 was formed. The electroplating procedures were as follows. First, the surface of the lining 11 was washed with water. Further, unnecessary oxides were removed from the surface of the lining 11 by pickling the surface of the lining 11. Thereafter, the surface of the lining 11 was again washed with water.

Upon completion of the above pretreatment, electroplating was performed by supplying a current to the lining 11 immersed in a plating bath. The bath composition of the plating bath contained methane sulfonic acid: 150 g/L, methane sulfonic acid Bi: 20 g/L, and an organic surfactant: 25 g/L. In the above plating bath, 0.18 g/L of pure Sb was dissolved by electrolysis. The bath temperature of the plating bath was set to 30° C. Further, the current to be supplied to the lining 11 was a direct current, and the current density was set to 2.0 A/dm$^2$.

In the plating bath, the amount of methane sulfonic acid can be adjusted between 50 and 250 g/L, and the amount of methane sulfonic acid Bi can be adjusted between 5 and 40 g/L. The amount of Sb is 0.1 to 3 g/L. The amount of the organic surfactant can be adjusted between 0.5 and 50 g/L. Also, the bath temperature of the plating bath can be adjusted at 20 to 50° C., and the current density of the current to be supplied to the lining 11 can be adjusted at 0.5 to 7.5 A/dm$^2$. The concentration of Sb in the overlay 12 can be increased by increasing the ion concentration of Sb in the plating bath.

For example, by setting the concentration of Sb in the plating bath to 0.2 g/L, the concentration of Sb (triangles) converging to about 2% by mass in FIG. 2 was obtained. By setting the concentration of Sb in the plating bath to 0.1 g/L, the concentration of Sb (circles) converging to about 1% by mass in FIG. 2 was obtained. Moreover, it was revealed that the concentration gradient of Sb is realizable by using methane sulfonic acid in the plating bath. When the overlay 12 was formed in a plating bath using EDTA (ethylenediaminetetraacetic acid) instead of methane sulfonic acid, an overlay 12 having no concentration gradient, as in sample C in FIG. 2, was formed.

After electroplating was performed in the above manner, water washing and drying were performed. Thus, the sliding member 1 was completed. Furthermore, the sliding bearing A was formed by combining the two sliding members 1 in a cylindrical shape, and attached to the engine.

Figure 5:
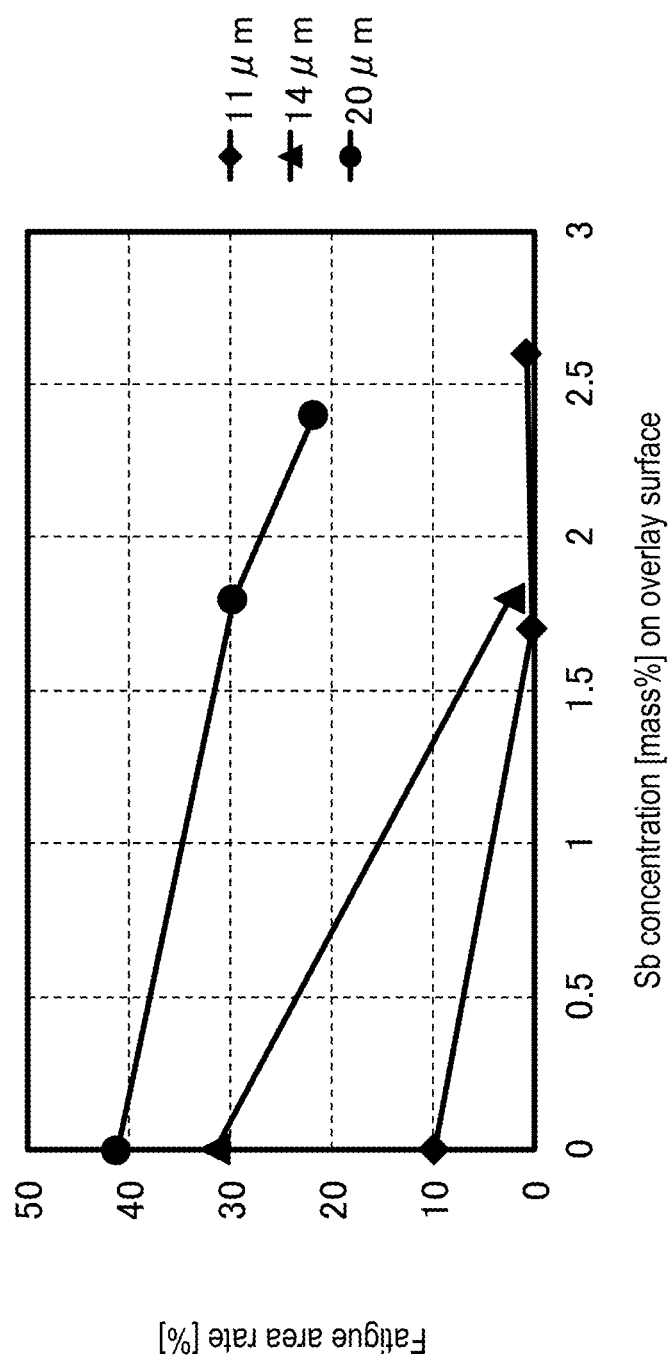
FIG. 5 is a graph showing the relationship between the concentration of Sb and the fatigue area rate.

(2) Concentration of Sb:

Table 2 indicates the results of measuring the fatigue area rates of a plurality of samples 1 to 8 in which the film thickness of the overlay 12 and the concentration of Sb on the surface were changed. Note that the first embodiment corresponds to sample 7. FIG. 5 is a graph of the fatigue area rates of samples 1 to 8. The vertical axis in FIG. 5 indicates the fatigue area rate, and the horizontal axis indicates the concentration of Sb on the surface.

TABLE 2

| Sample No. | Overlay thickness [μm] | Sb concentration [mass %] on surface | Fatigue area rate [%] |
|---|---|---|---|
| 1 | 11 | 0 | 9.9 |
| 2 | 11 | 1.7 | 0.2 |
| 3 | 11 | 2.6 | 0.8 |
| 4 | 14 | 0 | 31.5 |
| 5 | 14 | 1.8 | 2.4 |
| 6 | 20 | 0 | 41.1 |
| 7 (first embodiment) | 20 | 1.8 | 29.6 |
| 8 | 20 | 2.4 | 21.8 |

First, as the film thickness of the overlay 12 is larger, the fatigue area rate increases. This is considered to be because the stress acting on the inside of the overlay 12 increases as the film thickness of the overlay 12 increases, regardless of the concentration of Sb. However, it could be confirmed that the fatigue area rate can be reduced at any film thickness by incorporating Sb in the overlay 12. Therefore, the sliding member 1 having good fatigue resistance can be formed even if the film thickness of the overlay 12 is 20 μm as in the embodiment described above. In addition, when the fatigue area rates are compared at the same film thickness, the fatigue area rate can be suppressed more as the concentration of Sb on the surface is higher.

When the fatigue test was conducted on sample B of FIG. 2 and Table 1, the fatigue area rate was 31.6%, which was good. The amount of wear in this wear test was 11 μm. The amount of wear is the thickness of the overlay 12 reduced in the wear test. Here, focusing on the concentration of Sb in the worn portion (bold in Table 1) in sample B in Table 1, the minimum value was 0.53% by mass and the maximum value was 1.26% by mass. The average concentration on the surface at the time of wear was 0.92% by mass. Further, the wear of sample B has not progressed to the first region with a large concentration gradient of Sb. The average concentration of Sb on the surface at the time of wear was measured by the same method as that for the average concentration of Sb in the entire overlay. That is, the wear region constituted by the rectangular regions E present in the worn portion was set to measure the average mass concentration of Sb in the wear region as the average concentration of Sb in the worn portion. The average concentration of Sb in the worn portion means the average concentration of Sb on the surface at the time of wear, because the worn portion sequentially becomes a surface as the wear progresses.

From the above facts, it could be confirmed that, although the wear resistance is improved as the concentration of Sb on the surface of the overlay 12 increases, sufficient wear resistance can be exhibited even at 0.92% by mass. Further, the presence of a concentration gradient of Sb in the overlay 12 is not essential. It could be confirmed that, even if there is no concentration gradient of Sb, sufficient wear resistance can be exhibited by setting the concentration of Sb on the surface to 0.92% by mass or more.

Furthermore, the presence of a concentration gradient of Sb in the overlay 12 is not essential. Therefore, it can be said that sufficient wear resistance can be exhibited even in the overlay 12 having no concentration gradient in which the concentration of Sb increases as the depth from the surface increases, as in sample C in FIG. 2 and Table 1. The overlay 12 is configured to have no concentration gradient like sample C, thereby making it possible to secure the Sb concentration on the surface while suppressing the Sb concentration in the entire thickness.

(3) Other Embodiments:

In the above embodiment, the sliding members 1 constituting the sliding bearing A for bearing the crankshaft of an engine have been illustrated, but a sliding bearing A for another purpose may be formed by the sliding members 1 of the present invention. For example, a radial bearing such as a transmission gear bush or a piston pin bush/boss bush may be formed by the sliding member 1 of the present invention. Furthermore, the sliding member of the present invention may be used in thrust bearings, various washers, or swash plates for car air-conditioner compressors. Further, the matrix of the lining 11 is not limited to the Cu alloy, and it suffices that the material of the matrix is selected depending on the hardness of the counter shaft 2. Also, the back metal 10 is not essential and may not be used.

REFERENCE SIGNS LIST

1 Sliding member
2 Counter shaft

10 Back metal
11 Lining
12 Overlay
A Bearing
E Rectangular region
F Moving body
H Test shaft
R Connecting rod
X Interface

The invention claimed is:
1. A sliding member comprising:
an overlay formed of an alloy plating film of Bi and Sb,
wherein the overlay consists of Bi, Sb, and unavoidable impurities, and
wherein a concentration of Sb on a surface of the overlay is 0.92% by mass or more and 13% by mass or less,
wherein the overlay has a concentration gradient in which the concentration of Sb increases as a depth from the surface increases.

* * * * *